(12) United States Patent
De et al.

(10) Patent No.: US 9,787,571 B2
(45) Date of Patent: Oct. 10, 2017

(54) LINK DELAY BASED ROUTING APPARATUS FOR A NETWORK-ON-CHIP

(71) Applicant: Intel Corporation, Santa Clara, CA (US)

(72) Inventors: Vivek K. De, Beaverton, OR (US); Ram K. Krishnamurthy, Portland, OR (US); Gregory K. Chen, Portland, OR (US); Mark A. Anders, Hillsboro, OR (US); Himanshu Kaul, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 155 days.

(21) Appl. No.: 14/579,845

(22) Filed: Dec. 22, 2014

(65) Prior Publication Data

US 2016/0182354 A1     Jun. 23, 2016

(51) Int. Cl.
| | |
|---|---|
| *H04L 12/26* | (2006.01) |
| *H04L 12/727* | (2013.01) |
| *H04L 12/933* | (2013.01) |
| *H04L 12/773* | (2013.01) |
| *G06F 15/78* | (2006.01) |

(52) U.S. Cl.
CPC ........ *H04L 45/121* (2013.01); *G06F 15/7825* (2013.01); *H04L 43/0852* (2013.01); *H04L 45/60* (2013.01); *H04L 49/109* (2013.01)

(58) Field of Classification Search
CPC ............. H04L 43/0852; H04L 43/0882; H04L 43/0888; H04L 45/121; H04L 45/123; H04L 45/60; H04L 45/70; H04L 49/109; H04L 49/30; G06F 15/7825
See application file for complete search history.

(56) References Cited

U.S. PATENT DOCUMENTS

| | | | | |
|---|---|---|---|---|
| 7,792,030 | B2 * | 9/2010 | Mangano | G06F 13/4217 370/230.1 |
| 8,284,766 | B2 | 10/2012 | Anders et al. | |
| 8,601,423 | B1 | 12/2013 | Philip et al. | |
| 8,786,483 | B1 * | 7/2014 | Thompson | H03M 1/0836 341/120 |
| 9,025,457 | B2 * | 5/2015 | Yamaguchi | G06F 1/3206 370/235 |
| 9,344,358 | B2 * | 5/2016 | Bhardwaj | H04L 45/021 |
| 9,479,456 | B2 * | 10/2016 | Hutton | H04L 49/109 |
| 9,647,921 | B2 * | 5/2017 | Rangan | H04L 43/106 |

(Continued)

FOREIGN PATENT DOCUMENTS

KR     1020110065419     6/2011

OTHER PUBLICATIONS

Anders et al., "A 4.1Tb/s Bisection-Bandwidth 560Gb/s/W Streaming Circuit-Switched 8×8 Mesh Network-on-Chip in 45nm CMOS," ISSCC 2010, Session 5, Processors, 5.8, Intel Corporation, IEEE International Solid-State Circuits Conference, Feb. 8, 2010, IEEE Digest of Papers, 978-1-4244-6034-2, (pp. 110-112).

(Continued)

*Primary Examiner* — Alpus H Hsu
(74) *Attorney, Agent, or Firm* — Patent Capital Group (57) ABSTRACT

A router of a network-on-chip receives delay information associated with a plurality of links of the network-on-chip. The router determines at least one link of a data path based on the delay information.

20 Claims, 7 Drawing Sheets

(56) References Cited

U.S. PATENT DOCUMENTS

| | | | |
|---|---|---|---|
| 2008/0186983 A1 | 8/2008 | Dielissen et al. | |
| 2011/0069612 A1 | 3/2011 | Yamaguchi et al. | |
| 2013/0285685 A1* | 10/2013 | Bowman | G06F 1/10 324/750.3 |
| 2014/0119363 A1* | 5/2014 | Solihin | H04L 49/109 370/352 |
| 2014/0149766 A1* | 5/2014 | Samih | H04L 45/06 713/320 |
| 2015/0030023 A1* | 1/2015 | Gupta | H04L 45/20 370/390 |
| 2015/0071282 A1 | 3/2015 | Anders et al. | |
| 2015/0188829 A1 | 7/2015 | Satpathy et al. | |
| 2015/0220470 A1 | 8/2015 | Chen et al. | |
| 2015/0331831 A1* | 11/2015 | Solihin | H04L 49/109 709/212 |

OTHER PUBLICATIONS

Anders, et al., "A 2.9Tb/s 8W 64-Core Circuit-Switched Network-on-Chip in 45 nm CMOS," IEEE, 2008, 978-1-4244-2362-0/08 (pp. 182-185).

Bowman et al., "Circuit Techniques for Dynamic Variation Tolerance," DAC'09, Jul. 26-31, 2009, San Francisco, CA; ACM 978-1-60558-497-3/09/07 (pp. 4-7).

Chen et al., "A 340mV-to-0.9V 20.2Tb/s Source-Synchronous Hybrid Packet/Circuit-Switched 16×16 Network-on-chip in 22nm Tri-Gate, CMOS," ISSCC 2014, Session 16/SoC Building Blocks 16.1, Intel Corporation, 2014 IEEE International Solid-State Circuits Conference, Feb. 11, 2014, IEEE Digest of Technical Papers, 978-1-4244-6034-2 (pp. 276-278).

Dighe et al., "Within-Die Variation-Aware Dynamic-Voltage-Frequency Scaling Core Mapping and Thread Hopping for an 80-Core Processor," ISSCC 2010, Session 9/Digital Circuits & Sensors, 2010 IEEE International Solid-State Circuits Conference, Feb. 9, 2010, IEEE Digest of Technical Papers, 978-1-4244-6034-2 (pp. 174-176).

PCT International Search Report and Written Opinion in International Application No. PCT/US2015/062562 dated Apr. 19, 2016; 11 pages.

Tschanz et al., "On-Line Detection and Correction of Errors Due to Fast, Dynamic Voltage Droop Events"; 2010; (pp. 1-4).

Tschanz et al., "Tunable Replica Circuits and Adaptive Voltage-Frequency Techniques for Dynamic Voltage, Temperature, and Aging Variation Tolerance," 2009 Symposium of VLSI Circuits Digest of Technical Papers, 978-4-86348-010-0 (pp. 112-113).

\* cited by examiner

LINK DELAY BASED ROUTING APPARATUS FOR A NETWORK-ON-CHIP

FIELD

The present disclosure relates in general to the field of computer development, and more specifically, to a link delay based router apparatus for a network-on-chip (NoC).

BACKGROUND

Networks-on-Chip (NoCs), for on-die communication between cores, are important in enabling scalable performance as the number of cores and intellectual property (IP) blocks increases in multi-core processors. In such instances, communication between components becomes the key power and performance limiter. NoCs enable efficient sharing of on-chip wiring resources for communication with routers to control and arbitrate the flow of data between communicating components. Hybrid packet/circuit-switched NoCs enable high throughput and utilization of packet-switching with energy efficiency approaching circuit-switched data propagation. Various links between routers of NoCs may have different delays due to effects caused by process/voltage/temperature (PVT) variations and aging.

BRIEF DESCRIPTION OF THE DRAWINGS

Like reference numbers and designations in the various drawings indicate like elements.

DETAILED DESCRIPTION

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™, but may also be used in other devices, such as server computer systems, handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Figure 1:
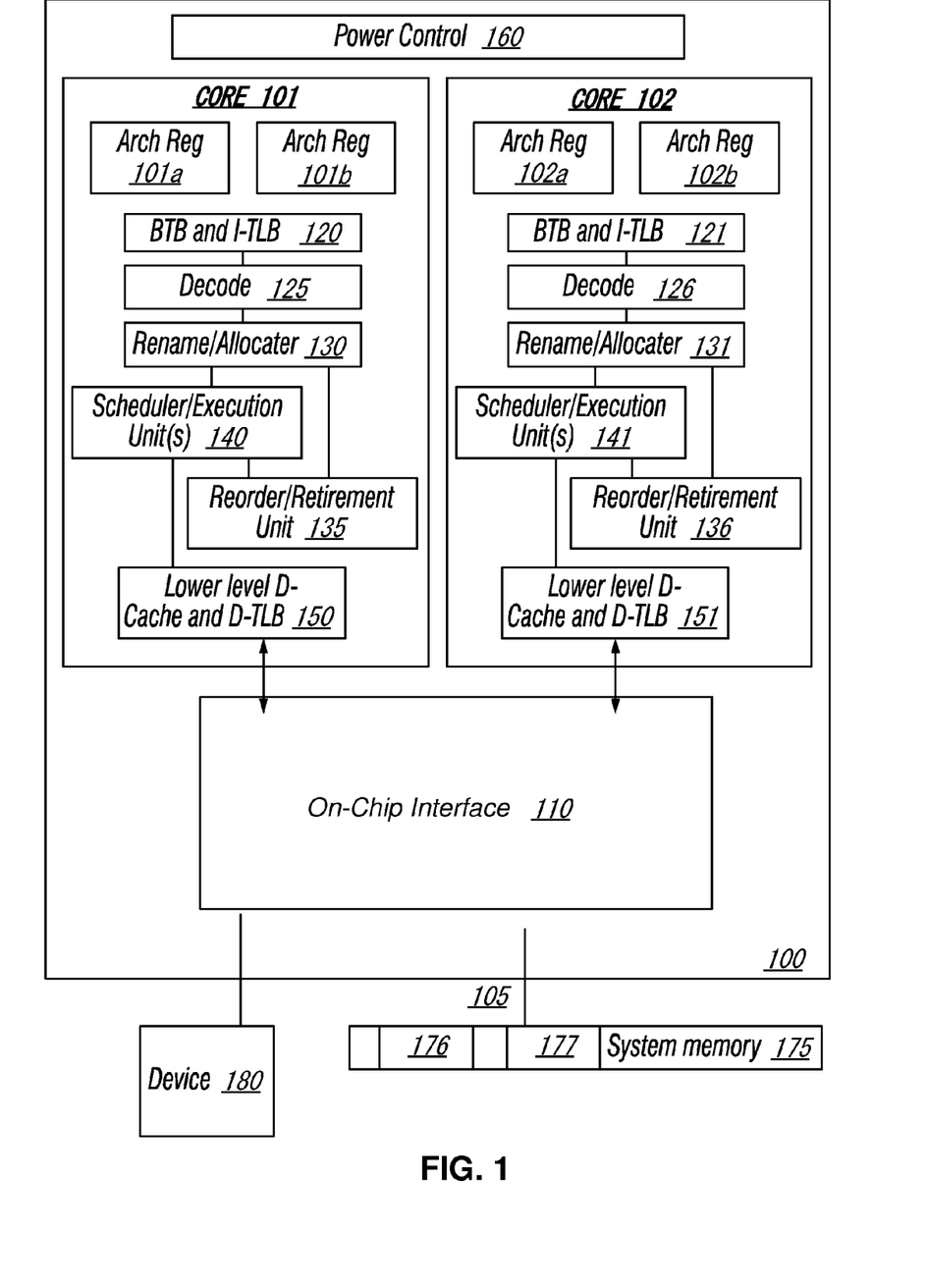
FIG. 1 illustrates a block diagram for an example computing system including a multicore processor in accordance with certain embodiments.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 2:
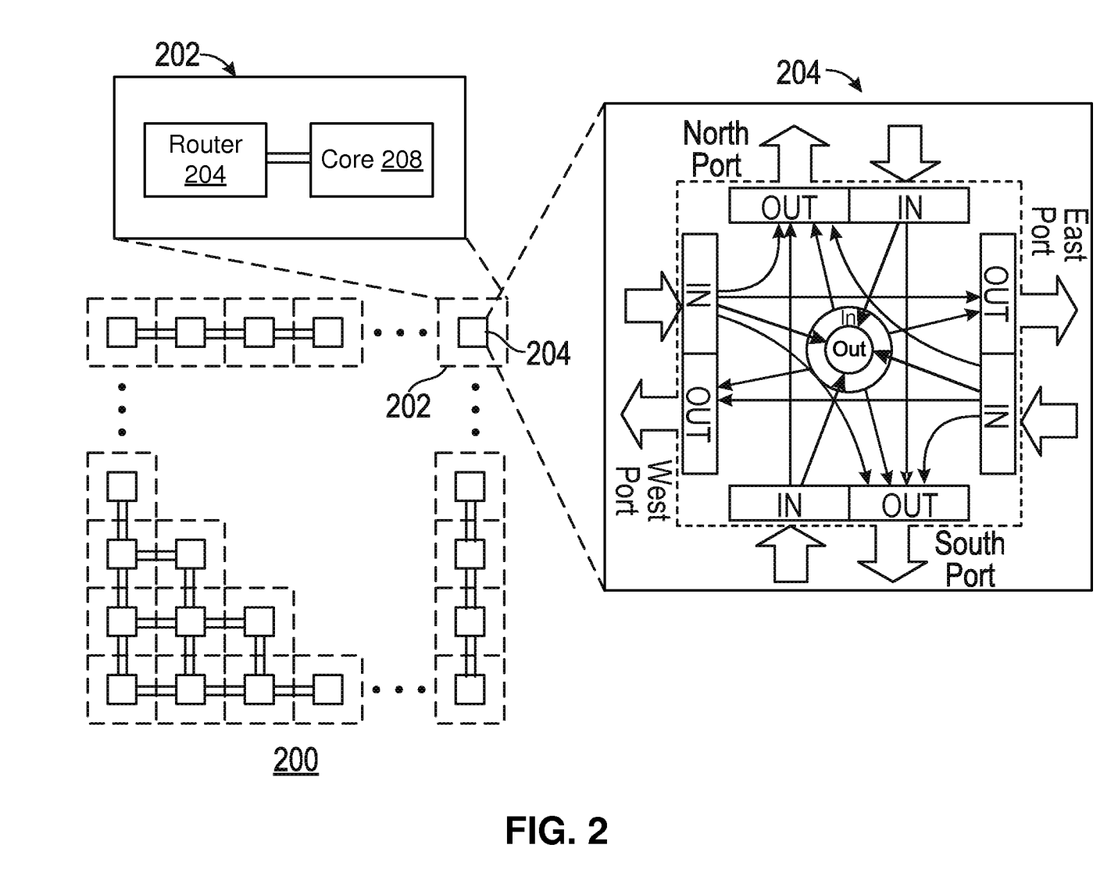
FIG. 2 illustrates a block diagram of a processor comprising a network on a chip (NoC) system including a plurality of routers in accordance with certain embodiments.

FIG. 2 illustrates a block diagram of a processor 200 comprising an NoC system including a plurality of routers 204 in accordance with certain embodiments. The processor 200 may include any processor or processing device, such as a microprocessor, an embedded processor, a digital signal processor (DSP), a network processor, a handheld processor, an application processor, a co-processor, an SoC, or other device to execute code. In particular embodiments, processor 200 is implemented on a single die.

In the embodiment depicted, processor 200 includes a plurality of network elements 202 arranged in a grid network and coupled to each other with bi-directional links. However, an NoC in accordance with various embodiments of the present disclosure may be applied to any suitable network topologies (e.g., a hierarchical network or a ring network), sizes, bus widths, and processes. Each network element 202 includes a router 204. The routers 204 may be communicatively linked with one another in a network, such as a packet-switched network and/or a circuit-switched network, thus enabling communication between components (such as cores, storage elements, or other logic blocks) of the NoC that are connected to the routers. In the embodiment depicted, each router 204 may be communicatively coupled to its own core 208 (or other logic block). As used herein, a reference to a core may also apply to other embodiments where a different logic block is used in place of a core. For example, various logic blocks may comprise a hardware accelerator (e.g., a graphics accelerator, multimedia accelerator, or video encode/decode accelerator), I/O block, memory controller, or other suitable fixed function logic. The processor 200 may include any number of processing elements that may be symmetric or asymmetric. For example, the cores 208 of processor 200 may include asymmetric cores or symmetric cores. Processor 200 may include logic to operate as either or both of a packet-switched network and a circuit-switched network to provide intra-die communication.

In particular embodiments, packets may be communicated among the various routers 204 using resources of a packet switched network. That is, the packet switched network may provide communication between the routers (and their associated cores). The packets may include a control portion and a data portion. The control portion may include a destination address of the packet, and the data portion may contain the specific data to be communicated on the die 100. For example, the control portion may include a destination address that corresponds to one of the network elements or cores of the die. The packet switched network may include buffering because a dedicated path is not assured from a source to a destination and so a packet may need to be stopped temporarily if two or more packets need to traverse the same link or interconnect. As an example, the packets may be buffered (e.g., by flip flops) at each of the respective routers as the packet travels from a source to a destination. The packets may be received, transmitted and processed by the routers 204. The packet switched network may use point-to-point communication between neighboring routers. The control portions of the packets may be transferred between routers based on a packet clock, such as a 4 GHz clock. The data portion of the packets may be transferred between routers based on a similar clock, such as a 4 GHz clock.

In an embodiment, routers of processor 200 may be variously provided in two networks or communicate in two networks, such as a packet switched network and a circuit-switched network. Such a communication approach may be termed a hybrid packet/circuit-switched network. In such embodiments, packets may be variously communicated among the various routers 204 using resources of the packet switched network and the circuit-switched network. In order to transmit a single data packet, the circuit-switched network may allocate an entire path, whereas the packet switched network may allocate only a single segment (or interconnect). In some embodiments, the packet switched network may be utilized to reserve resources of the circuit-switched network for transmission of data between routers 204.

Router 204 may include a plurality of port sets to variously couple to and communicate with adjoining network elements 202. For example, circuit-switched and packet switched signals may be communicated through these port sets. Port sets of router 204 may be logically divided, for example, according to the direction of adjoining network elements and/or the direction of traffic exchanges with such elements. For example, router 204 may include a north port set with input ("IN") and output ("OUT") ports configured to (respectively) receive communications from and send communications to a network element 202 located in a "north" direction with respect to router 204. Additionally or alternatively, router 204 may include similar port sets to interface with network elements located to the south, west, east, or other direction. In the embodiment depicted, router 204 is configured for X first, Y second routing wherein data moves first in the East/West direction and then in the North/South direction. In other embodiments, any suitable routing scheme may be used.

In various embodiments, router 204 further comprises another port set comprising an input port and an output port configured to receive and send (respectively) communications from and to another agent of the network. In the embodiment depicted, this port set is shown at the center of router 204. In one embodiment, these ports are for communications with logic that is adjacent to, is in communication with, or is otherwise associated with router 204, such as processor logic of a "local" core 208. Herein, this port set will be referred to as a "core port set," though it may interface with logic other than a core in some implementations. In another embodiment, this port set is for communications with a network element which is in a next level of a network hierarchy higher than that of router 204. In one embodiment, the east and west directional links are on one metal layer, the north and south directional links on a second metal layer, and the core links on a third metal layer. In an embodiment, router 204 includes crossbar switching and arbitration logic to provide the paths of inter-port communication such as that shown in FIG. 2. Logic (such as core 208) in each network element may have a unique clock and/or voltage or may share a clock and/or voltage with one or more other components of the NoC.

Performance and energy efficiency of on-die data communications links in NoC designs such as mesh and higher dimensional topologies are governed to a large degree by within-die variations from process/voltage/temperature (PVT) and aging-induced degradations over the lifetime of the NoC. Traditionally, performance impacts of these variations are accounted for by building worst-case guardbands into the voltage-frequency settings of the link. Impacts of these variations are becoming more severe in scaled process technologies, at lower operating voltages, and with integration of larger number of cores on the same die.

Dynamic variations such as voltage droop, temperature, and aging will manifest themselves as timing errors on the critical paths of the circuit. Under nominal conditions, when worst-case variations are not present, there is sufficient time for data to propagate down each critical path and be latched into the receiving state element, and no error occurs. However, under the presence of a dynamic variation the critical path delay increases, resulting in incorrect data latched into the receiving latch or flip-flop.

Current NoC routing algorithms do not account for impacts of static and dynamic PVT variations of link delays post-manufacturing and at runtime during the NoC lifetime. The routing algorithms may assume worst case conditions are uniformly present across the NoC at all times. Various embodiments of the present disclosure include an intelligent routing apparatus for packet-switched, circuit-switched, and hybrid NoC fabrics. In some embodiments, the intelligent routing apparatus utilizes post-manufacturing static mapping of link performance for each node-pair due to process variations. The apparatus utilizes tunable replica circuits (TRC) per link or a group of links that are calibrated at test time to track RC delay variation of the respective link or group of links due to voltage and temperature changes. These TRCs may be used for runtime sensing and mapping of local supply noises and temperature variations and for tracking corresponding impacts on link delay between adjacent nodes. Periodic testing of the TRCs (which undergo the same voltage-temperature stress as the links they emulate) is performed to account for aging-induced link delay changes over the processor lifetime. The information obtained from calibrating and testing the TRCs is provided for use by the routing algorithms. The algorithms may use heuristics to optimize the routing of NoC traffic using the latest available PVT variation and aging mapping information to improve the performance, throughput, energy efficiency, latency, error rate, and/or other operating characteristic of the NoC.

Figure 3:
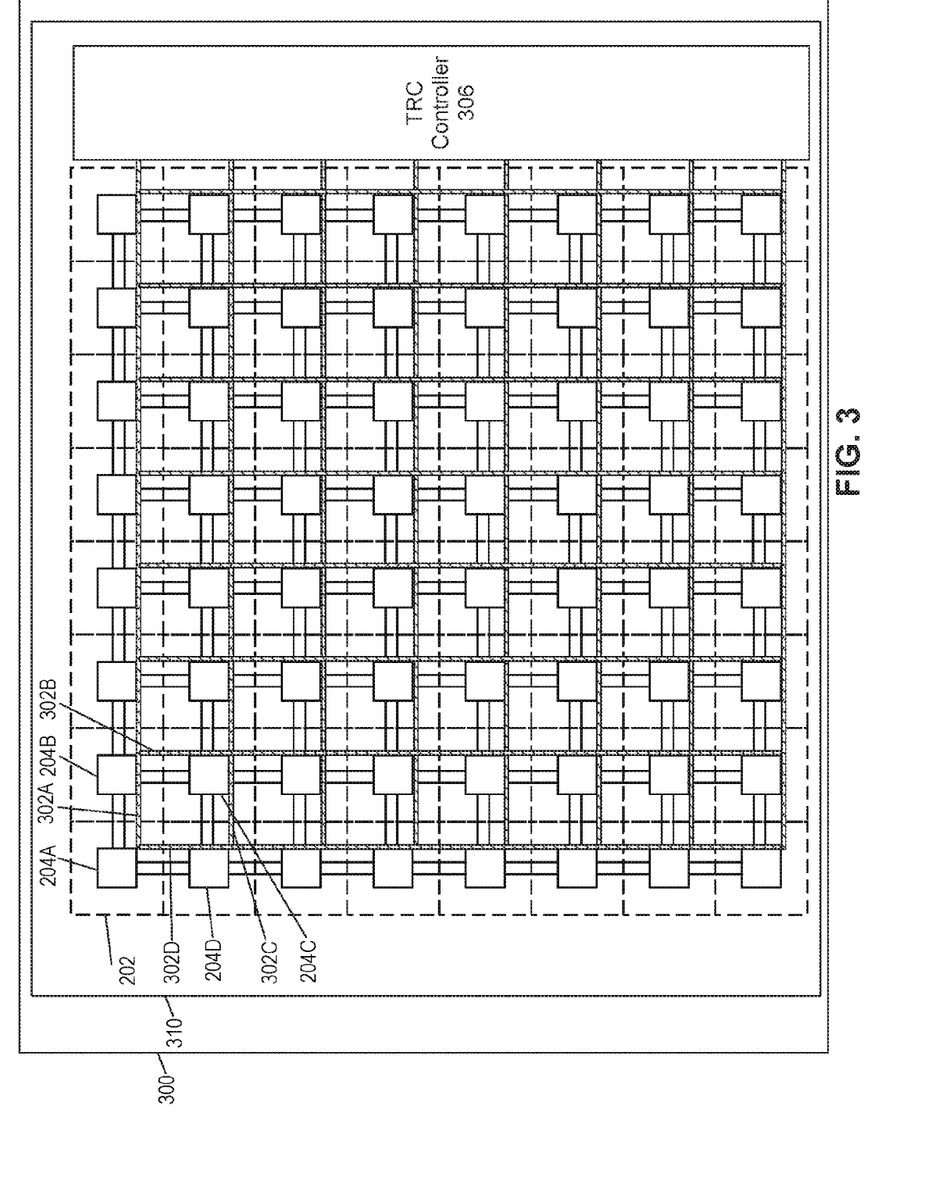
FIG. 3 illustrates a block diagram of a processor comprising an NoC system including a plurality of routers, tunable replica circuits (TRCs), and a TRC controller in accordance with certain embodiments.

FIG. 3 illustrates a block diagram of a processor 300 comprising an NoC system 310 including a plurality of network elements 202, routers 204, TRCs 302, and a TRC controller 306 in accordance with certain embodiments. Processor 300 may have any suitable characteristics described herein with respect to processor 200. In the embodiment depicted, TRCs are placed near each link. For example, TRC 302A is associated with a link between routers 204A and 204B, TRC 302B is associated with a link between routers 204B and 204C, TRC 302C is associated with a link between routers 204C and 204D, and TRC302D is associated with a link between routers 204D and 204A. As used herein, a link may include the interconnect between routers as well as logic and interconnect located within the routers. For example, a critical path of a link between routers 204A and 204B may include logic or interconnect located in either or both of routers 204A and 204B plus the interconnect between the routers. In particular embodiments, a critical path through the link may include one or more of direction logic (that determines which router to forward data to) and priority logic (that chooses between multiple competing requests to forward data). In other embodiments, a critical path of a link may include additional or other logic. As used herein, a link may refer to either a segment of a packet-switched path or a segment of a circuit-switched path in the NoC.

Each TRC 302 tracks the PVT variation and aging degradation of the link it is associated with. In other embodiments, a single TRC 302 may be associated with multiple links located near each other. For example, processor may include one TRC 302 per region, where a region may comprise any suitable number of links, such as four, eight, sixteen, or other number of links. In such embodiments, a single TRC 302 may be used to track the PVT variation and aging degradation of each link in the region it is associated with. In order to track delay of its associated link, each TRC 302 is coupled to a TRC controller 306 that communicates with the TRC 302 to effectuate calibration and testing of the TRC. A portion of each TRC as depicted may include interconnect necessary to carry control signals and testing results between the TRC and the TRC controller 306.

In the embodiment depicted, the TRCs run in horizontal and vertical lines across the processor, with each line comprising a plurality of TRCs that are each located in between two routers. However, the TRCs may be placed in any suitable geometries. The various elements shown in FIG. 3 are not necessarily drawn to scale. For example, each TRC doesn't necessarily span the length from one router to another router and the TRC controller doesn't necessarily span the entire length of the chip.

Figure 4:
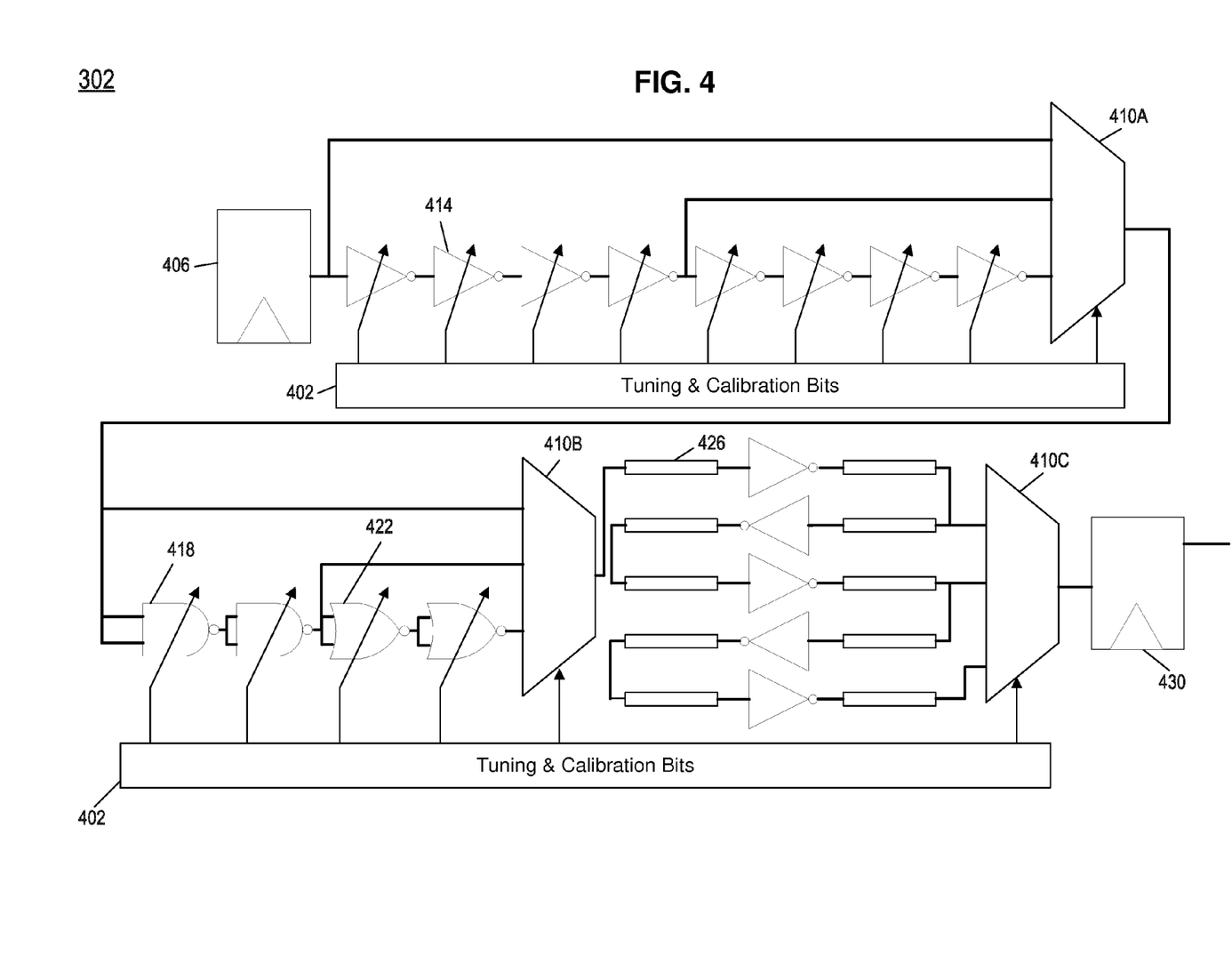
FIG. 4 illustrates an example TRC in accordance with certain embodiments.

FIG. 4 illustrates an example TRC 302 in accordance with certain embodiments. The TRC 302 uses the same voltage supply and clock as its associated link in order to accurately track delay variations at the link. The TRC may include any suitable combination of logic to effect an adjustable delay. In the embodiment depicted, TRC 302 includes a flip flop 406, error detection logic 430, and a delay portion in between flip flop 406 and the error detection logic. The flip flop 406 is clocked using the same clock as logic in the critical path associated with the link that the TRC 302 emulates. The flip flop 406 may clock data that is compared to data at the output of the delay portion of the TRC. In a particular embodiment, flip flop 406 comprises a toggle flip flop that alternates its output every clock cycle. In other embodiments, any suitable data generation logic may be used to provide data to the delay portion of the TRC.

The delay portion of the TRC 302 includes a variety of logic components collectively operable to effect a variable delay through the TRC. For example, in the embodiment depicted, the TRC includes inverters 414, NAND gates 418, NOR gates 422, and repeated interconnects 426. The TRC could include any other suitable logic components, such as stacked gates, pass gates, or other logic components.

Various delay components and the multiplexers of the delay portion of the TRC 302 may be controlled by tuning and calibration bits 402. As an example, tuning and calibration bits 402 may enable one or more of the components or change an operating characteristic (e.g., a size of a component or a P-N skew) of one or more of the components to adjust the delay through a segment of the TRC. Various multiplexers 410 may be controlled by bits 402 to pass one of multiple segments (each having its own delay) at each stage of the TRC. In various embodiments, the tuning and calibration bits 402 may be controlled by logic of the TRC or by TRC controller 306.

The output of the last multiplexer 410C is fed to error detection logic 430 which is clocked by the same clock used to clock flip flop 406 and the logic associated with the link (or group of links) that the TRC 302 tracks. Error detection logic 430 is operable to determine whether the data clocked by flip flop 406 matches the data clocked at error detection logic 430. If the data does not match, an error is detected, indicating that the delay through the TRC is longer than the cycle of the clock. In a particular embodiment, error detection logic 430 may clock received data a first time and a second time shortly thereafter. If the results are different, it may be determined that the delay through the TRC is roughly equal to the clock period (in reality the delay is slightly shorter).

Although a particular embodiment of a TRC is shown in FIG. 3, any other suitable TRC may be used. For example, in some embodiments, a TRC that comprises the logic used in the critical path of the associated link may be used. In particular embodiments, one design of a TRC may be used to implement each TRC across the processor 300. In other embodiments, multiple different TRCs may be used.

Figure 5:
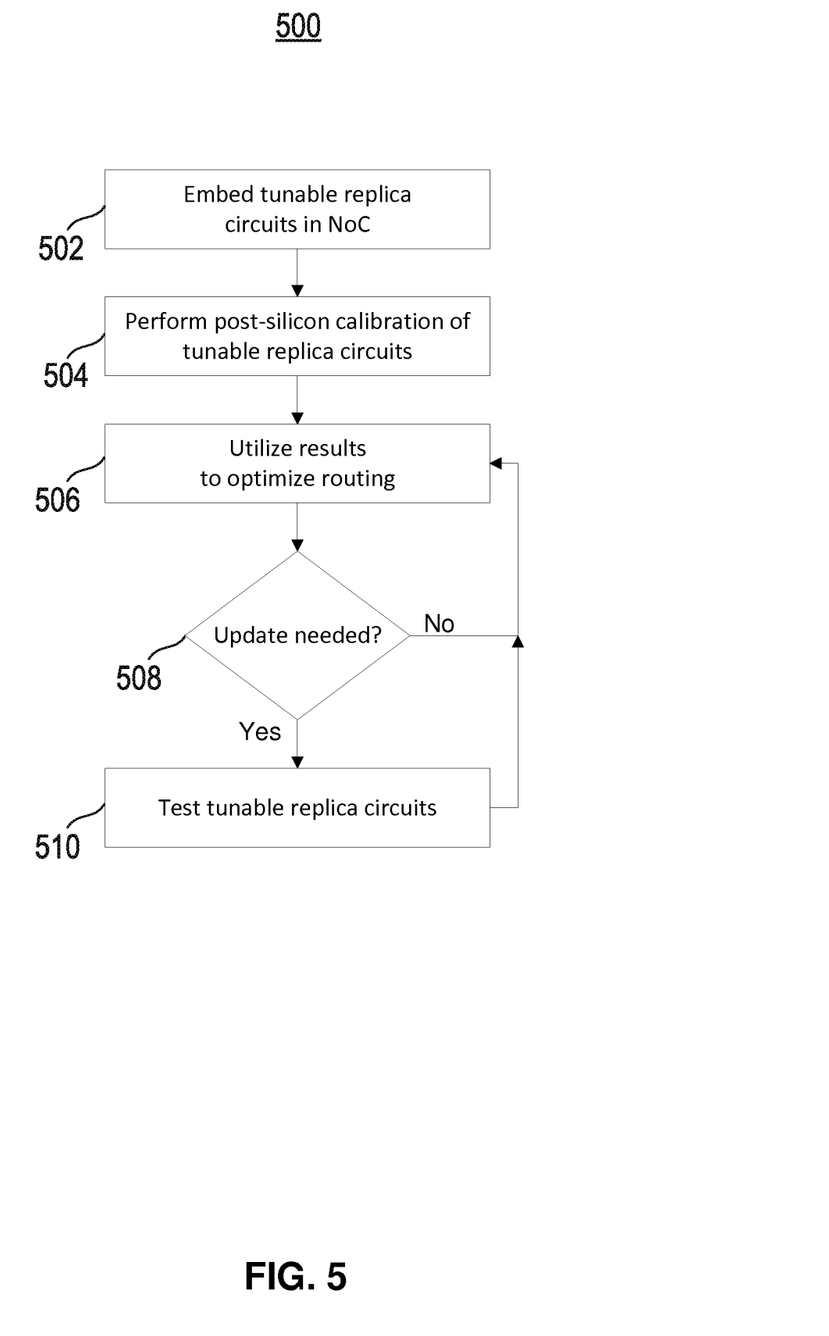
FIG. 5 illustrates an example method for obtaining delay information from TRCs in accordance with certain embodiments.

FIG. 5 illustrates an example method for obtaining delay information from TRCs in accordance with certain embodiments. At step 502, TRCs are embedded in an NoC. For example, the TRCs may be included in the design for the NoC and may be placed on the NoC close to links that the TRCs are to track. For example, a TRC may be placed proximate to each link in an NoC as depicted in FIG. 3. As another example, a TRC may be placed in a region of an NoC and may be used to represent a plurality of links in that region. The TRCs may be manufactured using the same processes as the links that they are associated with and thus are subject to similar PVT variations.

At step 504, post-silicon calibration of the TRCs is performed. This step may be performed at any suitable time after the chip is manufactured, but is generally performed early in the life of the chip, such as when the processor is powered up for the first time. Calibration may involve setting, by the TRC controller 306, one or more operating characteristics of a TRC and then cycling through a variety of TRC delay settings and monitoring the output of error detection logic 430 to determine delay characteristics at the particular TRC delay setting. One or more operating characteristics of the TRC is then adjusted and the procedure is repeated. Any suitable operating characteristics may be adjusted during calibration, such as voltage, frequency, temperature, or other operating characteristic. In a particular embodiment, various delay set points are tested for each pair of several different voltage and frequency set points.

In various embodiments, after a particular group of operating characteristics is set, the delay portion of the TRC is adjusted and the error detection logic 430 is monitored to determine whether the delay through the TRC is less than the clock period or is greater than the clock period (based on whether errors are being detected by the error detection logic 430). The delay portion of the TRC is adjusted again and the results are observed. The delay through the TRC may be adjusted and tested any suitable number of times for each set of operating characteristics. Additionally or alternatively, during calibration the delay through the TRC may be monitored to determine whether the delay through the TRC plus one or more fixed delay margins is less than the clock period or is greater than the clock period. Any suitable margins may be used, such as a maximum possible read delay change during an adaptive voltage/frequency response, a maximum possible read delay change in one clock cycle, or other suitable delay margin. These delay margins may be implemented using any suitable circuitry.

Various results of the calibration may be stored by the NoC, for example, by the TRC controller 306. In one embodiment, for each set of operating characteristics and delay setting of the TRC, one or more results are recorded, such as whether the particular delay setting resulted in a delay that was less than the clock period or greater than the clock period, whether the delay plus a first margin was less than the clock period or greater than the clock period, whether the delay plus the first margin plus a second margin was less than the clock period or greater than the clock period, and/or other suitable results. In other embodiments, only a subset of these results are stored. For example, if a first delay setting results in a delay that is less than the clock period but the next longest delay setting results in a delay that is more than the clock period, the first delay setting may be considered to match the clock period and may be stored. Similarly, if a first delay setting results in a delay that is less than the clock period minus one or more delay margins but the next longest delay setting results in a delay that is more than the clock period minus the one or more delay margins, the first delay setting may be considered to match the clock period minus the one or more margins and may be stored.

The calibrations may be performed for each TRC 302 on the processor 300. In some embodiments, the same sets of operating characteristics are used across the entire processor 300 to calibrate the TRCs. In other embodiments, the operating characteristics set points used during calibration may be tailored based on expected local conditions.

The results of the calibration may indicate relative delays among the links. For example, for a given set of operating characteristics, if the amount of delay configured into the delay portion of a first TRC at the point errors begin to occur is longer than the amount of delay configured into the delay portion of a second TRC at the point errors occur, the link associated with the first TRC is determined to have a delay that is shorter than the link associated with the second TRC.

After the calibration of the TRCs is complete, the delay information from the calibration results may be used to optimize routing on the NoC at step 506. This step will be described in more detail with respect to FIG. 6. At step 508, it is determined whether an update to the delay information is needed. If an update is not needed, the NoC may continue using the delay information to optimize routing. The NoC may use any suitable method for determining whether an update is needed. For example, the NoC may be configured to perform updates periodically, such as once an hour, once a day, once a month, other suitable interval, or upon an event such as when the processor is powered on. As another example, if errors are detected on one or more links, the NoC may determine that an update is needed. If at step 508 it is determined that an update to the delay information is needed, the TRCs may be tested at step 510 in order to track aging-induced delay degradations. Any suitable testing of the TRCs may be used. For example, a procedure similar to that described above with respect to calibration may be performed. In some embodiments, the testing procedures may use the calibration results as a starting point for the testing, such that the testing may not need to cycle through as many delay settings as the calibration procedures. The results of the testing indicate whether (and to what extent) a delay through a link associated with the TRC has increased due to stress caused by aging. Once the testing is complete, the updated results are again used at step 506 to optimize routing in the NoC.

Some of the steps illustrated in FIG. 5 may be repeated, combined, modified or deleted where appropriate, and additional steps may also be added to the flowchart. Additionally, steps may be performed in any suitable order without departing from the scope of particular embodiments.

Figure 6:
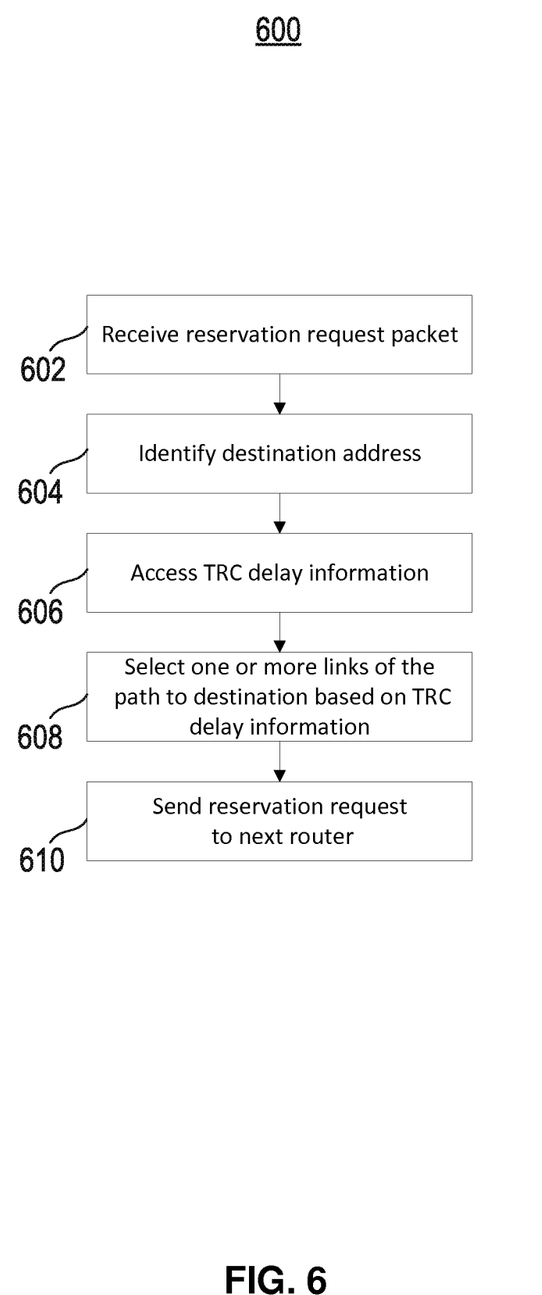
FIG. 6 illustrates an example method for routing a packet based on TRC delay information in accordance with certain embodiments.

FIG. 6 illustrates an example method for routing a packet based on TRC delay information in accordance with certain embodiments. Although this example focuses on a reservation request packet, the steps described herein may be applied to the routing of any suitable type of packet or circuit-switched data. At step 602, a reservation request packet is received at a port of a router. A request packet may enter an input port of a router. In a hybrid source-synchronous NoC implementation, request packets establish circuit-switched channels between source logic located at a network element 202 and destination logic located at a different network element. To begin a data transfer, the source logic sends a reservation packet toward the destination logic. This reservation packet may be communicated via a packet-switched portion of the NoC and may reserve resources for circuit-switched data communication between source logic and destination logic as the reservation packet travels from the source to the destination.

The reservation packet may include any suitable information facilitating the reservation of a circuit-switched channel. As an example, the reservation packet may include an address associated with the destination and optional sideband packet data. In an embodiment, a unique address may be associated with each core 208 or other logic block (and thus router 204 in cases where there is a 1:1 mapping between cores and routers). At step 604, the destination address of the packet is determined.

At step 606, TRC delay information is accessed. For example, a subset of the TRC delay information obtained from calibration or later testing of the TRCs may be obtained. In some embodiments, TRC delay information associated with links located in various possible routes from the router receiving the packet to the router associated with the destination address is accessed. Such delay information may indicate the relative delay through the links. For example, the delay information may indicate that a particular link has a higher delay margin than another link. As another example, the delay information may indicate that a particular link is less likely to experience an error than another link. In various embodiments, the subset of the TRC delay information that is accessed is based on the current or expected operating characteristics (e.g., voltage and/or frequency) of the links located in the various possible routes from the router to the destination.

At step 608, one or more links of the path to the destination logic are selected based on the TRC delay information. For example, each router (excepting the final router) that receives the packet may select the next router that the packet should be sent to and the associated link to that router. In particular embodiments, each router may access a routing table or utilize dedicated circuitry with various routing rules implemented in logic to determine the next router that the packet should be sent to. As another example, source structured routing may be implemented wherein the router that receives the packet directly from the source logic may select the entire path (i.e., the links that the packet should travel through to the destination logic). In particular embodiments, direction logic of the router determines the one or more links of the path.

The one or more links of the path may be determined based on any suitable objective. For example, routing algorithms performed at the routers to select the paths may be configured to optimize aggregate bandwidth, latency, energy efficiency, error rate, or other suitable performance metric of the NoC. In some embodiments, the one or more links of the path may also be chosen to avoid links that are likely to result in errors or have low delay margins (as indicated by testing of the associated TRCs). After the one or more links are selected at step 608, the reservation request is sent at step 610 to the next router via a link selected at step 608. If resources are not available to immediately forward the reservation request, then the reservation request is held until resources become available.

Some of the steps illustrated in FIG. 6 may be repeated, combined, modified or deleted where appropriate, and additional steps may also be added to the flowchart. Additionally, steps may be performed in any suitable order without departing from the scope of particular embodiments.

Figure 7:
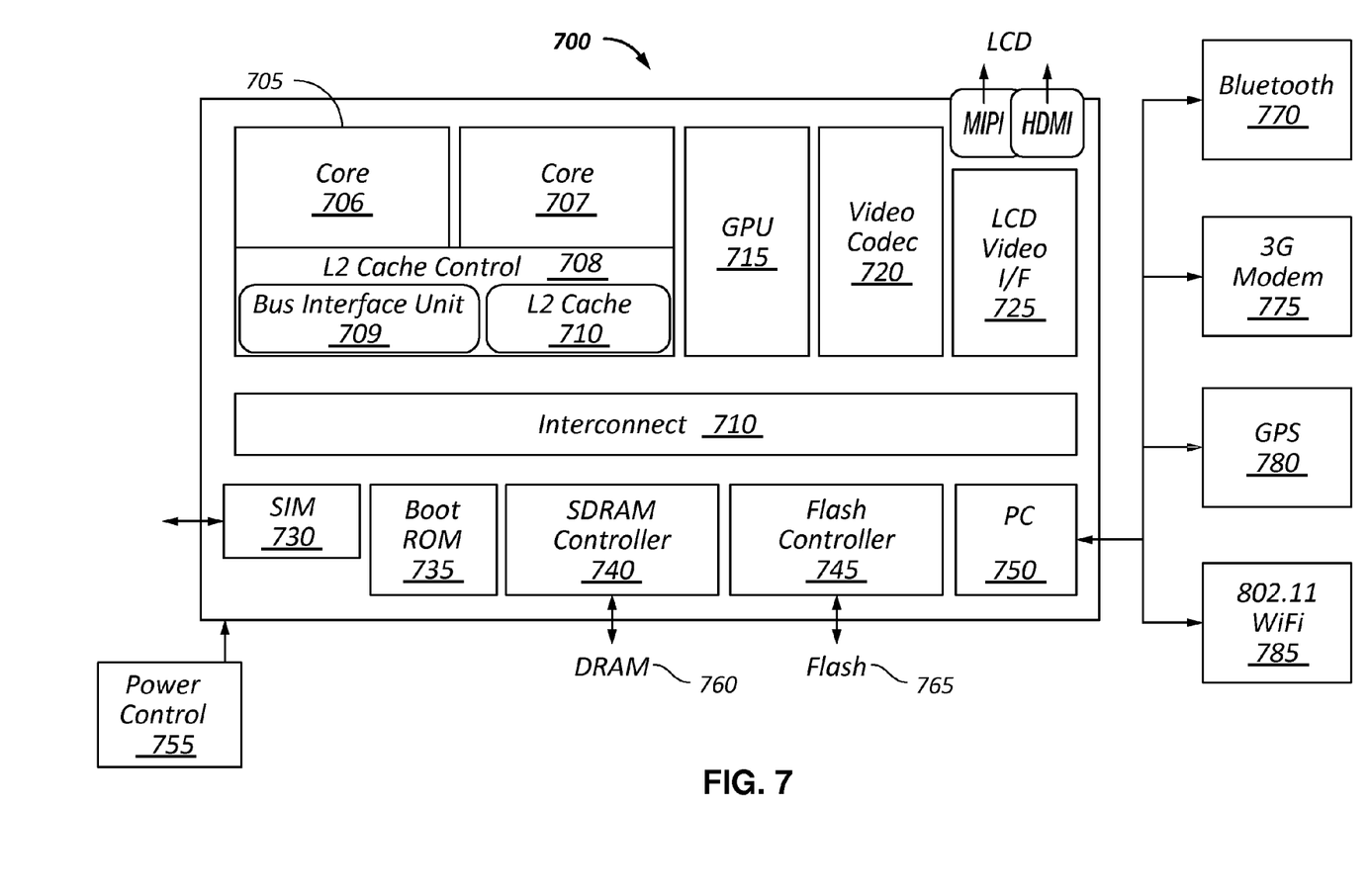
FIG. 7 illustrates another block diagram for an example computing system in accordance with certain embodiments.

FIG. 7 illustrates another embodiment of a block diagram for an example computing system in accordance with one embodiment. In this figure, an embodiment of a system on-chip (SOC) design in accordance with the disclosures is depicted. As a specific illustrative example, SOC 700 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 700 includes 2 cores—706 and 707. Similar to the discussion above, cores 706 and 707 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 706 and 707 are coupled to cache control 708 that is associated with bus interface unit 709 and L2 cache 710 to communicate with other parts of system 700. Interconnect 710 includes an on-chip interconnect, such as an IOSF, AMBA, or other interconnect discussed above, which potentially implements one or more aspects of the described disclosure.

Interface 710 provides communication channels to the other components, such as a Subscriber Identity Module (SIM) 730 to interface with a SIM card, a boot rom 735 to hold boot code for execution by cores 706 and 707 to initialize and boot SOC 700, a SDRAM controller 740 to interface with external memory (e.g. DRAM 760), a flash controller 745 to interface with non-volatile memory (e.g. Flash 765), a peripheral control Q1650 (e.g. Serial Peripheral Interface) to interface with peripherals, video codecs 720 and Video interface 725 to display and receive input (e.g. touch enabled input), GPU 715 to perform graphics related computations, etc. Any of these interfaces may incorporate aspects of the disclosure described herein.

In addition, the system illustrates peripherals for communication, such as a Bluetooth module 770, 3G modem 775, GPS 785, and WiFi 785. Note as stated above, a UE includes a radio for communication. As a result, these peripheral communication modules are not all required. However, in a UE some form a radio for external communication is to be included.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

One or more embodiments may provide an apparatus, a system, a machine readable storage, a machine readable medium, hardware- and/or software-based logic, a method, and a non-transitory machine readable medium (including information to represent structures, when manufactured, to be configured) to comprise at least one tunable replica circuit, a tunable replica circuit associated with one or more links and a router of a network-on-chip. The router is to access delay information associated with one or more of the at least one tunable replica circuit and route data in the network-on-chip based on the delay information.

In at least one example, the apparatus is a processor.

In at least one example, the data is to comprise packet data.

In at least one example, the data is to comprise a packet-based reservation request for a circuit-switched channel.

In at least one example, the router is further to route data based on the delay information by utilizing a routing algorithm that takes into account a bandwidth of the network-on-chip.

In at least one example, the router is further to route data based on the delay information by utilizing a routing algorithm that takes into account a latency of the network-on-chip.

In at least one example, the router is further to route data based on the delay information by utilizing a routing algorithm that takes into account energy efficiency of the network-on-chip.

In at least one example, the router is to route the data by selecting a next link for the data.

In at least one example, the router is to route the data by selecting a plurality of links to a destination of the data.

In at least one example, the tunable replica circuit is to track aging related delay of the one or more links associated with the tunable replica circuit.

In at least one example, a delay through the tunable replica circuit is tested periodically to track delay through the one or more links associated with the tunable replica circuit.

In at least one example, a tunable replica circuit controller is also included to obtain delay information from the at least one tunable replica circuit.

In at least one example, the tunable replica circuit comprises a plurality of delay components that are to provide an adjustable delay through the tunable replica circuit.

One or more embodiments may provide an apparatus, a system, a machine readable storage, a machine readable medium, hardware- and/or software-based logic (e.g., a router of a network-on-chip), a method, and a non-transitory machine readable medium (including information to represent structures, when manufactured, to be configured) to receive delay information associated with a plurality of links of the network-on-chip and determine at least one link of a data path based on the delay information.

In at least one example, the delay information is obtained from a plurality of tunable replica circuits, a tunable replica circuit to track delay through one or more of the plurality of links.

In at least one example, the delay information indicates relative delay among the plurality of links.

In at least one example, the at least one link comprises a link from the router of the network-on-chip to another router of the network-on-chip.

In at least one example, the at least one link comprises a plurality of links from the router of the network-on-chip to a router coupled to the destination of data to be routed.

In at least one example, the delay information associated with the plurality of links is to be updated periodically.

One or more embodiments may provide an apparatus, a system, a machine readable storage, a machine readable medium, hardware- and/or software-based logic, a method, and a non-transitory machine readable medium (including information to represent structures, when manufactured, to be configured) to comprise a plurality of cores, a core to be associated with a router of a network-on-chip and a plurality of links, a link to couple a router of the network-on-chip to another router of the network-on-chip; a plurality of tunable replica circuits, a tunable replica circuit to be associated with one or more of the plurality of links; and a tunable replica circuit controller to collect delay information from the plurality of tunable replica circuits. A router of the network-on-chip is to receive data and determine one or more of the links to send data through based on at least a portion of the delay information collected by the tunable replica circuit controller.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
   at least one tunable replica circuit, a tunable replica circuit of the at least one tunable replica circuit associated with one or more links, the tunable replica circuit to track process/voltage/temperature variations and aging-induced degradations in delay of the one or more links associated with the tunable replica circuit;
   a plurality of routers of a network-on-chip, a router of the plurality of routers to:
   access delay information associated with at least the tunable replica circuit; and
   route data in the network-on-chip based on the delay information.

2. The processor of claim 1, wherein the data is to comprise packet data.

3. The processor of claim 1, wherein the data is to comprise a packet-based reservation request for a circuit-switched channel.

4. The processor of claim 1, where the router is further to route data based on the delay information by utilizing a routing algorithm that takes into account a bandwidth of the network-on-chip.

5. The processor of claim 1, where the router is further to route data based on the delay information by utilizing a routing algorithm that takes into account a latency of the network-on-chip.

6. The processor of claim 1, where the router is further to route data based on the delay information by utilizing a routing algorithm that takes into account energy efficiency of the network-on-chip.

7. The processor of claim 1, wherein the router is to route the data by selecting a next link for the data.

8. The processor of claim 1, wherein the router is to route the data by selecting a plurality of links to a destination of the data.

9. The processor of claim 1, wherein the tunable replica circuit of the at least one tunable replica circuit is to track aging related delay of the one or more links associated with the tunable replica circuit.

10. The processor of claim 1, wherein a delay through the tunable replica circuit of the at least one tunable replica circuit is tested periodically to track delay through the one or more links associated with the tunable replica circuit of the at least one tunable replica circuit.

11. The processor of claim 1, wherein the processor is further to comprise a tunable replica circuit controller to obtain delay information from the at least one tunable replica circuit.

12. The processor of claim 1, wherein the tunable replica circuit of the at least one tunable replica circuit comprises a plurality of delay components that are to provide an adjustable delay through the tunable replica circuit of the at least one tunable replica circuit.

13. An apparatus comprising:
at least one tunable replica circuit, a tunable replica circuit of the at least one tunable replica circuit associated with one or more links of a network-on-chip, the tunable replica circuit to track process/voltage/temperature variations and aging-induced degradations in delay of the one or more links associated with the tunable replica circuit:
a plurality of routers of the network-on-chip, a router of the plurality of routers to:
receive delay information associated with the one or more links of the network-on-chip, wherein the delay information is generated using the tunable replica circuit; and
determine at least one link of the one or more links for a data path based on the delay information.

14. The apparatus of claim 13, wherein the delay information is obtained from a plurality of tunable replica circuits, a tunable replica circuit to track delay through one or more of the plurality of links.

15. The apparatus of claim 13, wherein the delay information indicates relative delay among the plurality of links.

16. The apparatus of claim 13, wherein the at least one link comprises a link from the router of the network-on-chip to another router of the network-on-chip.

17. The apparatus of claim 13, wherein the at least one link comprises a plurality of links from the router of the network-on-chip to a second router of the network-on-chip, the second router coupled to a destination of data to be routed.

18. The apparatus of claim 13, wherein the delay information associated with the plurality of links is to be updated periodically.

19. A non-transitory machine readable medium including information to represent structures comprising logic, when manufactured, to be configured to:
track, using a tunable replica circuit of at least one tunable replica circuit, process/voltage/temperature variations and aging-induced degradations in delay of one or more links of a network-on-chip, the one or more links associated with the tunable replica circuit;
receive delay information associated with the one or more links of the network-on-chip, wherein the delay information is determined using the tunable replica circuit; and
determine at least one link of the one or more links for a data path based on the delay information.

20. A system comprising:
a plurality of cores, a core of the plurality of cores to be associated with a router of a network-on-chip;
a plurality of links, a link of the plurality of links to couple the router of the network-on-chip to another router of the network-on-chip;
a plurality of tunable replica circuits, a tunable replica circuit of the plurality of tunable replica circuits to be associated with one or more of the plurality of links, wherein the tunable replica circuit is to track process/voltage/temperature variations and aging-induced degradations in delay of the one or more links associated with the tunable replica circuit; and
a tunable replica circuit controller to collect delay information from the plurality of tunable replica circuits; and
wherein the router of the network-on-chip is to receive data and determine one or more of the plurality of links to send data through based on at least a portion of the delay information collected by the tunable replica circuit controller.

* * * * *